United States Patent Office 3,579,570
Patented May 18, 1971

3,579,570
ETHANE-1,2 - DICARBOXY - 1,2-DIHYDROXY-1,2-DIPHOSPHONIC ACID, LOWER ALKYL ESTERS, ALKALI METAL SALTS THEREOF AND PROCESS FOR PREPARING SAME
Denzel Allan Nicholson, Springfield Township, Hamilton County, Ohio, and Darrel Campbell, King of Prussia, Pa., assignors to The Procter & Gamble Company, Cincinnati, Ohio
No Drawing. Filed Dec. 24, 1968, Ser. No. 786,765
Int. Cl. C07f 9/38; C11d 3/08
U.S. Cl. 260—502.4       8 Claims

ABSTRACT OF THE DISCLOSURE

Compounds having the formula

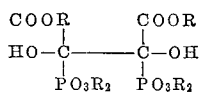

in which R is hydrogen, alkali metal, or an alkyl group having from 1 to about 6 carbon atoms, ammonium or alkanolammonium having 1 to 3 carbon atoms in each alkanol group by a process which comprises reacting an ester of ethane-1,2-dicarboxy-1,2-diphosphonic acid with an alkali metal hypohalite to form an epoxide compound having the formula

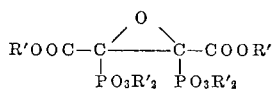

in which R' is an alkyl group having from 1 to about 6 carbon atoms, and hydrolyzing said epoxide. The compounds are useful as detergency builders, sequestering agents and anti-calculus agents in oral compositions.

FIELD OF THE INVENTION

A class of organic compounds is provided which contains di(carboxy) di(phosphono) di(hydroxy) groups. More specifically, the present invention relates to ethane compounds in which each carbon has attached to it a carboxy group, a phosphono group, and a hydroxy group. The acid, ester and salt forms are described.

The compounds prepared by reacting a lower alkyl ester of ethane-1,2-dicarboxy-1,2-diphosphonic acid, with an alkali metal hypohalite are useful in detergent compositions as builders, in water treating processes as sequestering agents, and in oral compositions as anti-calculus agents.

SUMMARY OF THE INVENTION

This invention pertains to compounds having the formula

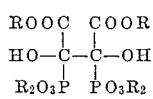

in which R is hydrogen, alkali metal, an alkyl group having from 1 to about 6 carbon atoms, ammonium or alkanolammonium having 1 to 3 carbon atoms in each alkanol group. The compounds of this invention are ethane-1,2-dicarboxy-1,2-dihydroxy - 1,2 - diphosphonic acid or salts or esters thereof. The esters are useful intermediates in the preparation of the acid and salts thereof. The acid and salts have many useful applications, including as detergency builders, sequesting agents, and anti-calculus agents in oral compositions.

According to the process of the present invention, a lower alkyl ester of ethane-1,2 - dicarboxy-1,2-diphosphonic acid is first reacted with an alkali metal hypohalite to form an epoxide ester compound which is then readily converted to a dihydroxy acid by hydrolysis.

DETAILED DESCRIPTION OF INVENTION

The present invention relates to compounds having the formula

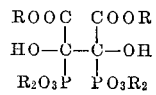

in which

R is hydrogen,
alkali metal,
an alkyl group having 1 to about 6 carbon atoms, ammonium, or
alkanolammonium having 1 to 3 carbon atoms in each alkanol group.

When R is hydrogen, the compound is ethane-1,2-dicarboxy-1,2-dihydroxy-1,2-diphosphonic acid. When R is an alkali metal, it can be sodium, potassium or lithium. The alkanolammonium group can be mono-, di- or triethanolammonium or corresponding methanol and propanol groups. When R is an alkyl group, it can be straight or branched chain, saturated or unsaturated and contain from 1 to about 6 carbon atoms. Illustrative alkyl groups are methyl, ethyl, propyl, iso-propyl, butyl, iso-butyl, e.g., 2-methyl-propane, pentyl, iso-pentyl, e.g., 2-methylbutane, hexyl, iso-hexyl, e.g., 2,4-dihexyl butane, and unsaturated groups such as 1-propene, 2-butene, 2-pentene, and 1-hexene. Partial salts and esters can be prepared as well as fully neutralized salts or fully esterified compounds.

Starting ester compounds

The starting compound in the synthesis reaction is a compound having a formula:

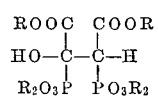

in which R represents an alkyl group having 1 to about 6 carbons as previously described. Specific examples are hexamethyl ester of ethane - 1,2 - dicarboxy-1,2-diphosphonic acid and the corresponding ethyl, propyl, butyl, pentyl and hexyl esters.

The starting compounds are known and can be prepared in any convenient manner. One suitable process, described by Pudovik in "Soviet Research on Organo-Phosphorus Compounds," 1949–1956, Part III, 547–85c, involves a sodium alkoxide catalyzed-addition of two moles of dialkyl phosphite to a lower alkyl (1 to 6 carbons) ester of acetylenedicarboxylic acid.

Esters of acetylenedicarboxylic acid such as the dimethyl ester are commercially available compounds.

A general equation for the reaction is given (R represents an alkyl group having 1 to 6 carbons as previously described):

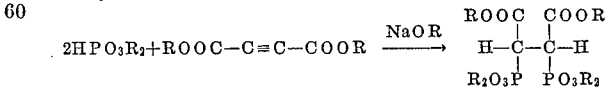

Examples of suitable dialkyl phosphite compounds which can be reacted with the esters of acetylenedicarboxylic acid are: dimethyl phosphite, diethyl phosphite, dipropyl phosphite, dibutyl phosphite, diisopropyl phosphite, dipentyl phosphite, dihexyl phosphite, bis(2-methylbutyl) phosphite, bis(3-ethylbutyl) phosphite, and the like.

As an illustration, when two equivalents of dimethylphosphite and one equivalent of dimethyl acetylenedicarboxylate are combined and heated to 95° for one hour in the presence of catalysts, $P^{31}MR$ spectra indicates that carbon-to-phosphorus bonded compounds are prepared. Suitable catalysts are known and include dissolved Na or NaH, sodium ethoxide, and di-t-butyl peroxide, and the like. Actually, the reaction does not require a catalyst since it proceeds at a satisfactory rate in the absence of a catalyst if higher reaction temperatures, e.g., 120–130° C., are maintained for a longer period of time, e.g., 2 hours. Since a work-up procedure is required when a catalyst is used, it is preferred to omit one and use instead the higher reaction temperature process.

Step 1

The reaction between the starting ester of ethane-1,2-dicarboxy-1,2-diphosphonic acid and the alkali metal hypohalite requires about stoichiometric amounts of each reactant, i.e., about 2 moles of hypohalite to each mole of the ester. Proportions in the range of 1.75:1 to about 2.5:1 of hypohalite to ester can be used. If lesser amounts are used, the yields are proportionally less. If larger amounts are used, no apparent advantage is gained.

The alkali metal hypohalite can be sodium or potassium hypochlorite or hypobromite. Sodium hypochlorite is preferred. The reaction can be carried out in water solution if the ester is soluble therein or in a two-phase system if the ester starting material is insoluble or only slightly water soluble. Reaction occurs rapidly on contact of the ester with the hypohalite. The reaction takes from about 5 minutes to about 4 hours, preferably less than 2 hours. The epoxy ester reaction product can be removed by extraction. The order of addition of reactants is not critical. The epoxy reaction product is a liquid and can be distilled to yield substantially pure epoxide. The reaction temperature is 0° C. to 90° C., preferably 0° C. to 75° C. Cooling can be performed to maintain the temperature below 75° C. if rapid addition of the ester is employed since the hypohalogenation can be somewhat exothermic. The reaction mixture can be stirred throughout the reaction.

The product formed by the reaction with the hypohalite is an epoxy ester compound (referred to hereinafter as the epoxide reaction product) having the formula

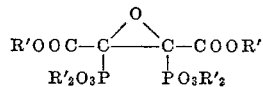

in which R' is an alkyl group having 1 to about 6 carbon atoms.

The epoxide reaction product from Step 1 is readily hydrolyzed to ethane - 1,2-dicarboxy-1,2-dihydroxy-1,2-diphosphonic acid by usual acid and base hydrolysis reactions. Alternative methods are described and illustrated below. One way of performing the hydrolysis step is to heat the epoxide reaction product to a temperature of about 70 C. to about 100° C. with an excess of hydrogen chloride (HCl) for from about 30 minutes to about 6 hours, preferably from 1 hour to 5 hours. This results in the formation of a chlorohydrin compound having a formula

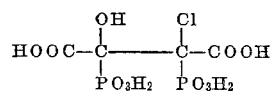

To this reaction mixture about seven equivalents of a base are added such as sodium or potassium hydroxide and the resulting solution is heated to about 40° C. to 110° C. for 5 minutes to 3 hours, preferably 50° C. to 100° C. for 5 minutes to 2 hours. The water is removed (evaporated) and crystallization of the hexasodium ethane-1,2-dicarboxy-1,2-dihydroxy-1,2-diphosphonate occurs on cooling. The corresponding hexapotassium salt is formed if the base employed is potassium hydroxide.

Hydrolysis of the epoxide reaction product of Step 1 is also satisfactorily performed by adding aqueous hydrogen bromide, anhydrous hydrogen chloride or anhydrous hydrogen bromide into a hexane solution of the epoxide ester reaction product. Sulfuric acid can also be used as well as nitric acid.

In place of sodium or potassium hydroxide, ammonium or lithium hydroxide can also be used. In order to prepare a salt of ethane-1,2-dicarboxy-1,2-dihydroxy-1,2-diphosphonic acid other than the fully neutralized hexasodium salt, the hexasodium compound can be combined with as many equivalents of an acid (hydrogen chloride, hydrogen bromide, and the like) as desired and the resulting product salt is readily crystallized from an aqueous solution. Another suitable method is to ion exchange the hexasodium salt of ethane-1,2-dicarboxy-1,2-dihydroxy-1,2-diphosphonic acid to a free acid form which can readily be neutralized to a desired salt by reaction with a base such as sodium hydroxide, potassium hydroxide, ammonium hydroxide, monoethanolammonium hydroxide, dimethanolammonium hydroxide, tripropanolammonium hydroxide and equivalent bases.

The hydrolysis step can include first a partial saponification step followed by completing the hydrolysis reaction. For instance, the epoxide reaction product is combined with one equivalent of a base as described before, e.g., sodium hydroxide, and the resulting ester solution heated at 40° C. to 110° C. for 5 minutes to 3 hours, preferably from 50° C. to 100° C. for 5 minutes to 1 hour. An excess of hydrogen chloride is then added and the solution is heated to 60° C. to 110° C., preferably 70° C. to 100 C., for from 30 minutes to 5 hours, preferably 1 hour to 3 hours. Excess acid and water present is removed by evaporation and heating leaving sodium chloride and ethane - 1,2 - dicarboxy-1,2-dihydroxy-1,2-diphosphonic acid. The sodium chloride, if desired, can be removed by ion exchanging the solution, or the ethane-1,2-dicarboxy-1,2-dihydroxy-1,2-diphosphonate can be isolated as a sodium salt by crystallization.

The present invention is illustrated by the following examples. They are not intended to be limiting on the foregoing description. They are merely illustrative and it will be readily apparent that they, in turn, will enable other obvious modifications and variations, all of which are intended to come within the scope of the present invention.

Preparation of starting material, tetraethyldimethylester of ethane-1,2-dicarboxy-1,2-diphosphonic acid Six moles, 853 gms., of dimethyl acetylenedicarboxylate $CH_3O_2CC \equiv CCO_2CH_3$ was combined with 300 ml. of toluene in a dry 3 liter, 3 neck flask, which was fitted with a magnetic stirrer, a thermometer, a 500 ml. addition funnel, and a water cooled Allihn condenser. The solution was heated to 120° C., and the heating mantle removed while 14 moles, 1945 gms., of diethyl phosphite, $$HPO_3(C_2H_5)_2$$

was added dropwise over a one hour period. The heat evolved was sufficient to maintain a steady reflux rate of the toluene at 135° C. during the addition period. After heat evolution ceased, the heating mantle was again applied to keep the reaction temperature at 135° C. for 4 hours. The product was then distilled to separate the unreacted starting reagents from the tetraethyldimethylester of ethane-1,2-dicarboxy-1,2-diphosphonic acid. A total of 2023 gms. (80% yield) of the diphosphonate ester was recovered, B.P. 175°–180° at 75–150$\mu$ pressure, $n_D{}^{25}$ 1.4535, $d_4{}^{25}$ 1.225. The $P^{31}MR$ spectrum of this material gave a single unresolved peak at 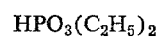 p.p.m.

*Analysis.*—Calc'd for $C_{14}H_{28}O_{10}P_2$ (percent): C, 40.2; H, 6.75; P, 14.8. Found (percent): C, 40.4; H, 6.5; P, 15.1. Molecular weight determined on a 3D 1 A Mechrolab Osmometer—420 (theory 418.3).

EXAMPLE I

Dimethyltetraethyl(P,P')-1,2-oxo-1,2-dicarboxy-1,2-diphosphonate

To 1,155 cc. of a 5.25% NaOCl solution was added 155.4 g. of tetraethyldimethyl ethane-1,2-dicarboxy-1,2-diphosphonate as prepared in the preceding discussion. The temperature of the resulting solution rose to 55° C. and was maintained there for 2 hours. After cooling to room temperature, the solution was extracted 5 times with 300 cc. portions of CHCl₃. Removal of the CHCl₃ left a colorless liquid weighing 152.4 g. Analysis proved the product to be a nearly quantitative yield of dimethyltetraethyl(P,P')-1,2-oxo-1,2-dicarboxy - 1,2 - diphosphonate. P³¹MR spectrum: $\delta = -7.9$ p.p.m. (multiplet).

*Analysis.*—Calc'd (percent): C, 38.9; H, 6.1; P, 14.3; molecular weight 432. Found (percent): C, 38.2; H, 5.9; P, 14.5; molecular weight 475.

The sodium hypochlorite solution can be replaced with an equivalent amount of sodium hypobromite or potassium hypochlorite and the corresponding sodium and potassium salts are obtained in quantitative yields. The tetraethyldimethyl ester can be replaced by equivalent amounts of hexamethyl, hexaethyl and hexahexyl groups and the reaction proceeds in a satisfactory manner.

EXAMPLE II

Pentasodium ethane-1,2-dicarboxy-1,2-dihydroxy-1,2-diphosphonate

The dimethyltetraethyl(P,P')-1,2-oxo-1,2 - dicarboxy-1,2-diphosphonate reaction product from Example I was dissolved in an equal amount of n-Bu₂O, the solution heated to 105° and HBr passed through for 7 hours. At the end of this period two layers were present. Extraction with water separated the bottom layer and the n-Bu₂O layer was discarded. Removal of the water left a colorless oil which was dissolved in a solution of 44.4 g. NaOH (1.11 mole) in water. This solution was heated to 60°, methanol added to bring to the cloud point, and on cooling a white precipitate formed. The P³¹MR spectrum of this solid, $\delta = -6.0$ p.p.m. (broad), indicated that all ester groups had not been removed. Therefore, it was hydrolyzed by boiling 2 hours with HCl (50/50 HCl+water). After removal of excess HCl, a water solution of the oil which remained was titrated to pH-9 at 60°. On cooling, a white solid was collected which analysis proved to be pentasodium ethane-1,2-dicarboxy-1,2-dihydroxy - 1,2-diphosphonate.

The total solid collected weighed 34.2 g. (22.6%). P³¹MR spectrum: $\delta = -6.7$ p.p.m. (singlet).

*Analysis.*—Calc'd (percent): C, 11.4; H, 0.7; P, 14.7; Na, 27.4. Found (percent): C, 13.4; H, 0.6; P, 15.0; Na 27.6.

EXAMPLE III

Ethane-1,2-dicarboxy-1,2-dihydroxy-1,2-diphosphonic acid

One mole (362 g.) of hexamethyl ester of ethane-1,2-dicarboxy-1,2-diphosphonate are combined with a solution containing 2 moles of sodium hypobromite dissolved in one liter of water. This solution is stirred for 15 minutes and then extracted three times with CCl₄. Removal of the CCl₄ leaves about 360 g. of a substantially pure epoxide ester reaction product

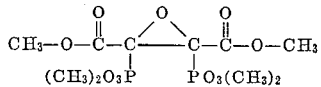

This epoxide is combined with 500 cc. of a 50/50 mixture of concentrated hydrogen chloride and water and the solution is heated to 90° C. for 3 hours. Following removal of the hydrogen chloride and excess water the remaining product is an oily product. This is redissolved in water and 7 equivalents of sodium hydroxide are added. The mixture is heated to 70° C. for 30 minutes. The resulting solution is passed through an ion-exchange column to yield an aqueous solution of ethane-1,2-dicarboxy-1,2-dihydroxy-1,2-diphosphonic acid. The water is evaporated leaving the substantially pure acid as a viscous liquid.

EXAMPLE IV

Tripotassium ethane-1,2-dicarboxy-1,2-dihydroxy-1,2-diphosphonate

Dimethyl tetraethyl-1,2-oxo-1,2-dicarboxy-1,2 - diphosphonate (1 mole, 432 g.) is combined with 40 g. (1 mole) of NaOH in 1 liter of water and the mixture is heated to 75° C. for 30 minutes. To this solution 1000 cc. of concentrated HCl are added and the total solution is refluxed for 2½ hours. After removal of excess HCl and most of the water (leaving about 250 cc. of final solution), the solution is ion-exchanged to remove the sodium ions. Again the solvent is removed, this time to dryness. The resulting viscous liquid is combined with 168.3 g. (3 moles) of KOH in 500 cc. of water. Removal of water leaves tripotassium ethane-1,2-dicarboxy-1,2-dihydroxy-1,2-diphosphonate in a substantially pure form.

The water soluble salt compounds of the present invention as well as the acids have numerous useful applications. For instance, they are especially useful as sequestering agents and also as builders in detergent compositions. This latter invention is the subject of a separate copending patent application.

The notable sequestering properties of the compounds of the present invention were demonstrated by performing a Swatch-Dip test as described below. This test measures the relative sequestering ability of a compound by employing a fabric-swatch impregnated with soap and an aqueous solution containing a predetermined level of calcium hardness minerals. Briefly, the procedure calls for preparing an aqueous solution containing the hardness ions and dipping or immersing into the solution a fabric-swatch which has been impregnated with a measured amount of soap. The swatch remains in the solution for a predetermined amount of time. A measurement is then made to determine the amount of free calcium which has been adsorbed by the fabric-swatch. The identical procedure is then repeated but with a predetermined concentration of a sequestrant compound added to the aqueous solution containing the calcium ions. Measurements of adsorbed calcium are again made and comparisons drawn. Differences between the amounts of calcium adsorbed in tests with and without sequestrants are attributed to the ability of the sequestrant to sequester the calcium and thereby decrease the level of free calcium ion concentration available for adsorption by the immersed fabric-swatch. A percentage is obtained in this manner which is usually referred to as "percentage hardness retained by sequestrant." Tests were conducted in this manner using sodium tripolyphosphate for purposes of a comparison. Sodium tripolyphosphate is a widely recognized sequestrant compound. Based on these tests, it was observed that at an equal concentration of 0.01% a pentasodium salt of ethane-1,2-dicarboxy-1,2-dihydroxy-1,2-phosphonate surpassed sodium tripolyphosphate by a considerable score of 57% to 51%. At an equal sequestrant concentration of 0.02%, the respective percentages were 93% and 68%. At an equal sequestrant concentration of 0.03%, the pentasodium salt of ethane-1,2-dicarboxy-1,-2-dihydroxy-1,2-phosphonic acid was still superior by a score of 93% to 77%. Even at a concentration of 0.06%, the sodium tripolyphosphate had only increased to 88% whereas the pentasodium salt increased to 94%. These tests demonstrate the valuable sequestering property of the compounds of the present invention. In fact, it is apparent that these tests demonstrate that the pentasodium salt of ethane-1,2- dicarboxy-1,2-dihydroxy-1,2-phosphonic acid even exceeds the sequestering value of sodium tripolyphosphate when the latter is used at three times (.06 vs. .02%) the level of the pentasodium salt.

The useful sequestering property of the compounds of the present invention is also demonstrated by practicing the testing procedure described by Irani and Callis, J. Physical Chemistry, 64, 1398 (1960) except that caprate was used instead of oxalate as the indicator of the nephelometric end point. In this demonstration the pentasodium salt of ethane-1,2 - dicarboxy-1,2 - dihydroxy-1,2-phosphonate was compared to sodium tripolyphosphate and sodium pyrophosphate. The efficiencies (in g. calcium/100 g. anhydrous Na salt) were as follows.

|  | pH | | |
|---|---|---|---|
|  | 9 | 10 | 11 |
| Pentasodium salt of ethane-1,2-dicarboxy-1,2-dihydroxy-1,2-phosphonate | 8.5 | 15.8 | 16.4 |
| Sodium pyrophosphate | 2.7 | 4.6 | 5.0 |
| Sodium tripolyphosphate | 7.5 | 8.1 | 7.9 |

The sequestering properties described above indicate that the compounds of the present invention are useful in numerous applications in which hardness minerals represent a problem. For instance, the present invention can provide a useful process for treating aqueous solutions, e.g,. water softening, by adding to the solution an effective amount of, for example, alkali metal salt (sodium) of ethane-1,2-dicarboxy - 1,2-dihydroxy - 1,2-phosphonic acid compound. The acid form can also be used. Other applications in which the compounds of this invention can be useful are descaling of textiles on which alkylene earth metals have been deposited; lessening of ash content in fabrics which have been treated with pyrophosphate-containing washing agents; in cleaning processes such as washing bottles in which precipitate of calcite is a problem; as additives to dye baths; agricultural uses such as preparing concentrates of herbicides and plant-treating compositions. Numerous other uses for sequestering agents of the type prepared by the present invention are described in the literature such as "Organic Sequestering Agents" authored by S. Chabarek and A. Martell, published in 1959 by John Wiley and Sons, Inc., New York, New York.

The ethane-1,2-dicarboxy - 1,2-dihydroxy - 1,2-diphosphonic acid compounds of the present invention, and especially the alkali metal salts thereof, are useful as builders in detergent compositions in admixture with water soluble organic synthetic detergents including anionic, nonionic, zwitterionic and ampholytic detergents. The invention embodying this usefulness is the subject of a copending, commonly assigned patent application which is being filed concurrently herewith. The title of the application embodying the compounds of the present invention as builders is being filed by D. Allan Nicholson and Darrel Campbell on "Built Detergent Compositions." The concurrently filed application is incorporated herein by reference. As an example of a built detergent composition employing the compounds of the preesnt invention is given below.

| | Percent |
|---|---|
| Sodium alkyl benzene sulfonate in which the alkyl is a straight chain dodecyl radical | 18 |
| Hexasodium ethane-1,2-dicarboxy-1,2-dihydroxy-1,2 - diphosphonate | 50 |
| Sodium sulfate | 15 |
| Sodium silicate (ratio of $SiO_2$:$Na_2O$ of 2:1) | 7 |
| Water | 10 |

The foregoing description of the invention has been presented describing certain operable and preferred embodiments. It is not intended that the invention should be limited since variations and modifications thereof will be obvious to those skilled in the art, all of which are within the spirit and scope of this invention.

The compounds of the present invention, in addition to the utility disclosed above, have the surprising property of inhibiting calcium hydroxyapatite crystal growth. For this reason, the compounds of the present invention are useful as anti-calculus agents in oral compositions such as toothpaste, mouthwash and the like. Compositions for this utility are described in a commonly assigned copending patent application being concurrently filed with the present application. The title of the application is "Oral Compositions For Calculus Prophylaxis." The inventors are Nathaniel B. Tucker and Homer W. McCune. Moreover, this same property renders the compounds of the present invention useful in the treatment of disease involving anomalous calcification and decalification in animal tissue. Such an invention is described more fully in a patent application being filed concurrently herewith by Marion D. Francis on "Compositions For Inhibiting Anomalous Deposition And Mobilization Of Calcium Phosphate In Animal Tissue." Both of the foregoing patent applications are incorporated herein by reference.

What is claimed is:
1. Compounds having the formula

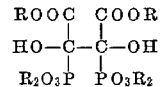

in which

R is hydrogen,
alkali metal,
an alkyl group having 1 to about 6 carbon atoms,
ammonium, or
alkanolammonium having 1 to 3 carbon atoms in each alkanol group.

2. Ethane-1,2-dicarboxy-1,2-dihydroxy - 1,2 - diphosphonic acid.

3. Alkali metal salts of ethane-1,2-dicarboxy-1,2-dihydroxy-1,2-diphosphonic acid.

4. A process for preparing ethane-1,2-dicarboxy-1,2-dihydroxy-1,2-diphosphonic acid which comprises reacting a lower alkyl ester of ethane-1,2-dicarboxy-1,2-diphosphonic acid with about a stoichiometric amount of an alkali metal hypohalite at a temperature of from 0° C. to 90° C. to form an epoxide reaction product having the formula

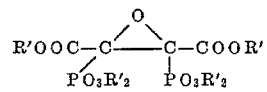

in which R' is an alkyl group having 1 to about 6 carbon atoms, and hydrolyzing said epoxide reaction product to form said acid.

5. A process according to claim 4 in which the hydrolysis step comprises adding aqueous hydrogen chloride to said epoxide reaction product.

6. A process according to claim 5 in which the alkali metal hypohalite is sodium hypochlorite.

7. A process for preparing alkali metal salts of ethane-1,2-dicarboxy-1,2-dihydroxy-1,2-diphosphonic acid which comprises reacting a lower alkyl ester of ethane-1,2-dicarboxy-1,2-diphosphonic acid with about a stoichiometric amount of an alkali metal hypohalite at a temperature of from 0° C. to 90° C. to form an epoxide reaction product having the formula

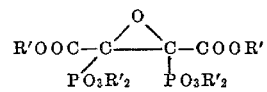

in which R' is an alkyl group having 1 to about 6 carbon atoms, hydrolyzing said epoxide reaction product with hydrogen chloride to form the corresponding chlorohydrin, and reacting chlorohydrin compound with an alkali metal base to convert said chlorohydrin to an alkali metal salt of ethane-1,2-dicarboxy-1,2-dihydroxy-1,2-diphosphonate.

8. A process according to claim 7 in which the alkali metal hypohalite is sodium hypochlorite.

References Cited

UNITED STATES PATENTS

| | | | |
|---|---|---|---|
| 3,093,672 | 6/1963 | Miller | 260—932 |
| 3,189,628 | 6/1965 | Knight et al. | 260—932 |
| 3,202,579 | 8/1965 | Berth et al. | 260—932 |
| 3,400,148 | 9/1968 | Quimby | 260—932 |
| 3,404,178 | 10/1968 | Roy | 260—502.4P |

FOREIGN PATENTS

| | | | |
|---|---|---|---|
| 861,778 | 2/1961 | Great Britain | 260—348A |
| 1,045,373 | 12/1958 | Germany | 260—502.4P |

OTHER REFERENCES

Griffin et al., "J. Org. Chem." (August 1965), vol. 30, pp. 2829, 2830.

LEON ZITVER, Primary Examiner

J. E. EVANS, Assistant Examiner

U.S. Cl. X.R.

23—108, 296; 71—11; 210—58; 252—8.6, 138; 260—348, 501.19, 932, 999